(12) United States Patent
Artaev et al.

(10) Patent No.: US 11,994,501 B2
(45) Date of Patent: May 28, 2024

(54) METHOD FOR RANKING LIBRARY HITS IN MASS SPECTROMETRY

(71) Applicant: LECO Corporation, St. Joseph, MI (US)

(72) Inventors: Viatcheslav Artaev, St. Joseph, MI (US); Todd Richards, Watervliet, MI (US); Lorne Fell, Stevensville, MI (US); Kevin Lee McNitt, Saint Joseph, MI (US)

(73) Assignee: LECO Corporation, St. Joseph, MI (US)

( * ) Notice: Subject to any disclaimer, the term of this patent is extended or adjusted under 35 U.S.C. 154(b) by 936 days.

(21) Appl. No.: 16/975,526

(22) PCT Filed: Feb. 25, 2019

(86) PCT No.: PCT/US2019/019354
§ 371 (c)(1),
(2) Date: Aug. 25, 2020

(87) PCT Pub. No.: WO2019/165347
PCT Pub. Date: Aug. 29, 2019

(65) Prior Publication Data
US 2021/0033577 A1 Feb. 4, 2021

Related U.S. Application Data

(60) Provisional application No. 62/635,379, filed on Feb. 26, 2018.

(51) Int. Cl.
*G01N 30/86* (2006.01)
*G01N 30/72* (2006.01)

(52) U.S. Cl.
CPC ......... *G01N 30/86* (2013.01); *G01N 30/7206* (2013.01); *G01N 30/8675* (2013.01)

(58) Field of Classification Search
CPC . G01N 30/86; G01N 30/7206; G01N 30/8675
(Continued)

(56) References Cited

U.S. PATENT DOCUMENTS

| 8,160,819 | B2 * | 4/2012 | Fagerquist | G16B 30/10 |
| | | | | 702/19 |
| 10,535,507 | B2 * | 1/2020 | Yamada | H01J 49/0036 |

(Continued)

FOREIGN PATENT DOCUMENTS

| JP | 2005-083952 A | 3/2005 |
| JP | 2005-532565 A | 10/2005 |

(Continued)

OTHER PUBLICATIONS

Kerbar, A. et al., "CASE via MS: Ranking structure candidates by mass spectra", CROATICA Chemica Acta, 2006, vol. 79, No. 3, pp. 449-464.

(Continued)

*Primary Examiner* — Ricky Go
(74) *Attorney, Agent, or Firm* — Honigman LLP

(57) ABSTRACT

A method for ranking analytes includes the steps of analyzing an experimental analyte in a mass spectrometer. The method includes comparing the experimental analyte to a plurality of candidate analytes in a library hit list, and assigning a cumulative confidence score to each candidate analyte based on the steps of comparing the experimental analyte to the candidate analytes based on a library similarity score, comparing the experimental analyte to the candidate analytes based on of a presence of the most abundant isotope of a molecular ion and its mass, comparing the experimental analyte to the candidate analytes based on an abundance of fragment ions and a mass of the fragment ions, and, in some implementations, comparing the experimental analyte to the candidate analytes based on a retention index (Continued)

value. The method includes ranking the candidate analytes based on the cumulative confidence score of each candidate analyte.

16 Claims, 5 Drawing Sheets

(58) Field of Classification Search
USPC .......................................................... 702/24
See application file for complete search history.

(56) References Cited

U.S. PATENT DOCUMENTS

| | | | |
|---|---|---|---|
| 10,553,412 B2* | 2/2020 | Satulovsky | ........ G01N 33/6848 |
| 2008/0234945 A1* | 9/2008 | Walk | ...................... G16C 20/20 |
| | | | 702/19 |
| 2014/0297201 A1 | 10/2014 | Knorr et al. | |
| 2015/0340216 A1 | 11/2015 | Kwiecien et al. | |
| 2016/0259792 A1* | 9/2016 | Nedwed | ................. G06F 18/22 |
| 2017/0131248 A1* | 5/2017 | Kageyama | ............ H01J 49/004 |
| 2018/0150617 A1* | 5/2018 | Richardson | ........... H01J 49/164 |

FOREIGN PATENT DOCUMENTS

| | | |
|---|---|---|
| WO | 2016002047 A1 | 1/2016 |
| WO | 2017047580 A1 | 3/2017 |

OTHER PUBLICATIONS

Fell. L. et al., "Accurate Mass Spectral Database: Harnessing the Power of High Performance Mass Spectrometry at Long Last", Poster, In: Analysis & Seprations from Technology Networks, Jun. 16, 2016, https://www.technologynetworks.com/analysis/posters/accurate-mass-spectral-database-harnessing-the-power-of-high-performance-mass-spectrometry-at-long-last-229369.

International Search Report dated Jun. 12, 2019, relating to International Application No. PCT/US2019/019354.

Japanese Patent Office, 1st Office Action for Application No. 2022-114376 dated Jun. 8, 2023.

International Preliminary Report on Patentability and Written Opinion dated Aug. 27, 2020, relating to International Application No. PCT/US2019/019354.

* cited by examiner

METHOD FOR RANKING LIBRARY HITS IN MASS SPECTROMETRY

CROSS-REFERENCE TO RELATED APPLICATIONS

This application claims priority under 35 U.S.C. § 371 to Patent Cooperation Treaty Application No. PCT/US2019/019354, filed Feb. 25, 2019, which claims priority under 35 U.S.C. § 119(e) to U.S. Provisional Application No. 62/635,379, filed Feb. 26, 2018. The disclosures of these prior applications are considered part of the disclosure of this application and are hereby incorporated by reference in their entireties.

TECHNICAL FIELD

This disclosure relates to the field of processing data obtained from analyses of samples in a mass spectrometer, including by means of Gas Chromatography—High Resolution Mass Spectrometry (GC-HRMS), Comprehensive Two-Dimensional Gas Chromatography—High Resolution Mass Spectrometry (GC×GC-HRMS), and the like.

BACKGROUND

It may be desirable to improve reliability of analytes assignments resulting from analysis of complex mixtures of volatiles and semi-volatiles compounds. It may be desirable to reduce an analyst's efforts in reviewing the results of analytes assignment by sorting the possible library hits in a more meaningful order and reducing the probability of erroneous results in the library hit lists.

In Gas Chromatography—High Resolution Mass Spectrometry (GC-HRMS), as well as in Comprehensive Two-Dimensional Gas Chromatography—High Resolution Mass Spectrometry (GC×GC-HRMS), a mixture of unknown or suspected analytes is introduced into the GC injector and the analytes are separated according to their physicochemical properties. The separated analytes consequently elute from a GC column and are introduced into an ion source of the mass spectrometer for ionization. Analyte molecules are ionized and fragment ions are created. The mass spectrometer then detects the ions from analyte molecules and fragment ions, and the data is presented as mass spectra, which is a list of ion mass and intensity combinations corresponding to each moment of detection.

The mass spectra may be recorded, saved, and searched against mass spectral databases. Mass spectral databases include commercially available databases, such as, for example, NIST, Willey, etc. As another example, the mass spectral databases may be custom-created by users. The results of the search may be presented as a hit list for each of the analytes in question. The hit list contains a list of possible candidates for assignment suggested for the analyte in question. Each of the hit list entries contains information describing the candidate, e.g., name, molecular formula, molecular structure, mass spectrum, ring double bond equivalents (RDBE), etc., and information describing a matching probability of the experimental mass spectrum to the library mass spectrum of the candidate, information such as, for example, similarity score, reverse search score, probability score, etc.

The hit list may contain many entries (depending on a set of matching parameters set by user), and the hit list may be sorted in order of similarity scores from high to low, with the assumption that candidates with higher similarity scores are more likely to be a correct assignment. An analyst may perform a review of the analyte assignments. During the review, the analyst may select the highest ranked hit as the peak assignment. Alternatively, the analyst may select the peak assignment from a range of the highest ranked hits, e.g., from a top five, a top ten, or any other suitable range.

The review may include making sense of the possibility of the presence of the suggested candidate in the analyzed sample based on sample type and origin, looking for characteristic fragment ions, correspondence to chromatographic conditions (i.e., how volatile the candidates are and how it corresponds to injector and column temperature), elution order, etc. The review may require substantial expertise in GC-MS and related topics, and may be trusted to experts in the GC-MS field.

In some cases, the analyst may obtain a candidate analyte (as a purchased standard or synthesized), conduct an analysis on the known analyte with identical, or similar, conditions as the candidate analyte, and compare the results from the known analyte with the candidate analyte. If the mass spectra and the chromatographic retention time match, then typically the assignment will be confirmed. The process of analytes assignment by manual curation of chromatograms and mass spectra, as well as confirmation by running standards, may be long, expensive, and may not guarantee 100% reliability of the results. Therefore, improvements in reliability and simplification of the process of analytes assignments may be desirable for analytical chemists and researchers using the GC-MS results.

SUMMARY

One aspect of the disclosure provides a method for ranking analytes includes the steps of analyzing an experimental analyte in a mass spectrometer, for example, in connection with gas chromatography—mass spectrometery. The method includes comparing the experimental analyte to a plurality of candidate analytes in a library hit list, and assigning a cumulative confidence score to each candidate analyte based on the steps of comparing the experimental analyte to the candidate analytes based on a library similarity score, comparing the experimental analyte to the candidate analytes based on a presence and mass accuracy of a most abundant isotope of the molecular ion, comparing the experimental analyte to the candidate analytes based on a presence and mass accuracy of fragment ions, and, in some implementations, comparing the experimental analyte to the candidate analytes based on a retention index value. The method includes ranking the candidate analytes based on the cumulative confidence score of each candidate analyte.

Implementations of the disclosure may include one or more of the following features.

The library similarity score may have a failing range of values equal to and below X, a passing range of values equal to and above Y, and a neutral range of values between X and Y.

A portion of the cumulative confidence score of a candidate analyte in the failing range may be assigned a value of −1.5, a portion of the cumulative confidence score of a candidate analyte in the neutral range may be assigned a value of 0, and a portion of the cumulative confidence score of a candidate in the passing range may be assigned a value of 1.

The mass accuracy, relative to the candidate, of the most abundant isotope of the molecular ion may have a failing criteria, a passing criteria, and a neutral criteria based on a minimum acceptable abundance and a mass accuracy window. The failing criteria may require the abundance of the most abundant isotope of the molecular ion to exceed the minimum acceptable abundance and a mass of the most abundant isotope of the molecular ion to be outside of the mass accuracy window. The passing criteria may require the abundance of the most abundant isotope of the molecular ion to exceed the minimum acceptable abundance and the mass of the most abundant isotope of the molecular ion to be within the mass accuracy window. The neutral criteria may be satisfied if the molecular ion is not expected to be in the mass spectrum, its abundance in the library is below the established minimum abundance, or the number of the ions in the ion peak is below minimum number.

A portion of the cumulative confidence score of a candidate analyte satisfying the failing criteria may be assigned a value of −1.5, a portion of the cumulative confidence score of a candidate analyte satisfying the passing criteria may be assigned a value of 1, and a portion of the cumulative confidence score of a candidate analyte satisfying the neutral criteria may be assigned a value of 0.

The fragment ions may have a passing criteria, neutral criteria, and a failing criteria based on a minimum acceptable abundance and a mass accuracy window. The passing criteria may be satisfied if the abundance of the fragment ions exceeds the minimum acceptable abundance and the mass of the fragment ions, in which chemical formulae are generated only from the subsets of the chemical elements of the molecular formula of the candidate analyte, is within the mass accuracy window, while fragment ions chemical formulae may only be a subset of the elements from the molecular formula of the candidate analyte. The failing criteria may be satisfied if the abundance of the fragment ions exceed the minimum acceptable abundance and the mass of the fragment ions, in which chemical formulae are generated only from the subsets of the chemical elements of the molecular formula of the candidate analyte, is outside of the mass accuracy window. The neutral criteria may be satisfied if there are no fragment ions to exceed the minimum acceptable abundance or the number of ions in the peaks are below the minimum criteria.

A portion of the cumulative confidence score of a candidate analyte satisfying the passing criteria may be assigned a value of 1, and a portion of the cumulative confidence score of a candidate analyte satisfying the failing criteria may be assigned a value of −1.5, and a portion of the cumulative confidence score of a candidate analyte satisfying the neutral criteria may be assigned a value of 0.

The minimum acceptable abundance of the fragment ions may be Z %.

The retention index value may have a passing range, a neutral range, and a failing range based on an acceptable retention index window. The passing range may be within the acceptable retention index window. The neutral criteria may require the retention index value of the candidate analyte to be unavailable. The failing range may be outside the acceptable retention index window.

A portion of the cumulative confidence score of a candidate analyte in the passing range may be assigned a value of 1, a portion of the cumulative confidence score of a candidate analyte satisfying the neutral criteria may be assigned a value of 0, and a portion of the cumulative confidence score of a candidate analyte in the failing range may be assigned a value of 0.

The acceptable retention index window may be W units.

The cumulative confidence score may range from −6 to 4.

The candidate analytes may be ranked in descending order of the cumulative confidence score of each candidate analyte.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
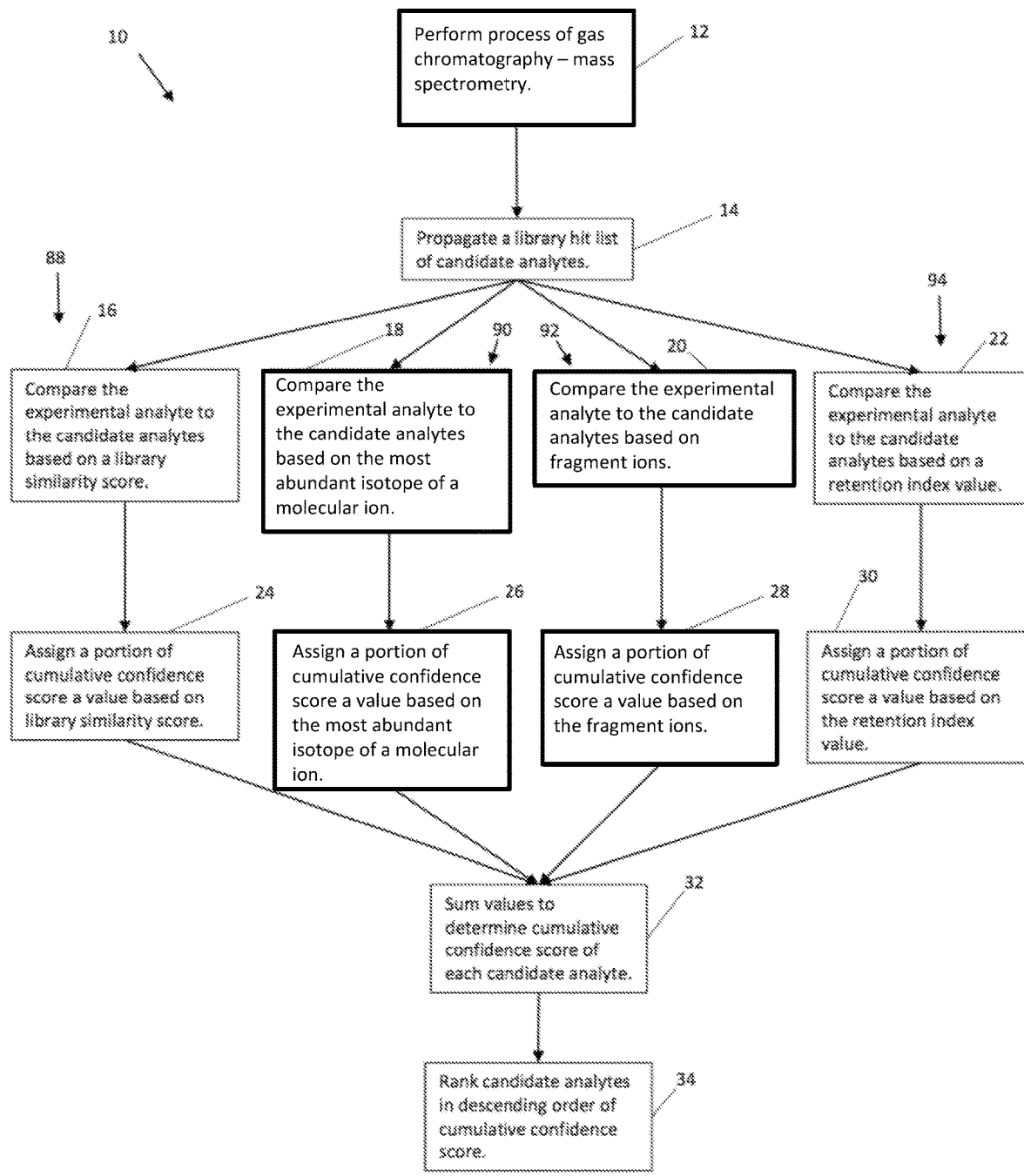
FIG. 1 is a flowchart of a method for ranking analytes.

With reference to FIG. 1, a method for ranking analytes 10 is generally shown. The method for ranking analytes 10 includes the steps of analyzing an experimental analyte using gas chromatography mass spectrometry 12. While the method is disclosed in connection with the chromatography mass spectrometry arrangement shown at 12, other configurations are suitable for the ranking method in connection with other mass spectrometer configurations. With continued reference to FIG. 1, the method 10 includes comparing the experimental analyte to a plurality of candidate analytes in a library hit list 16-22, and assigning a cumulative confidence score to each candidate analyte 24-30 based on the steps of comparing the experimental analyte to the candidate analytes based on a library similarity score 16, comparing the experimental analyte to the candidate analytes based on a most abundant isotope of a molecular ion 18, comparing the experimental analyte to the candidate analytes based on an abundance and mass accuracy of the fragment ions 20, and, in some implementations, comparing the experimental analyte to the candidate analytes based on a retention index value 22. The method includes ranking the candidate analytes based on the cumulative confidence score of each candidate analyte 34.

In an implementation and as described herein, the experimental analyte may be analyzed using gas chromatography mass spectrometry (GC-MS) or gas chromatography high resolution mass spectrometry (GC-HRMS). As another example, the analysis of the experimental analyte 12 may be performed by any suitable process. The use of GC-MS, GC×GC-MS, GC-HRMS or GC×GC-HRMS may be such as that known in the art.

The library hit list of candidate analytes may be propagated 14 by any suitable means, such as, for example, a software application, a manual process, etc. The library hit list may contain data about each of the candidate analytes such that the candidate analytes may be compared to the experimental analyte. The comparison of the candidate analytes to the experimental analyte, and the corresponding data, may be presented in a hit table.

Figure 2:
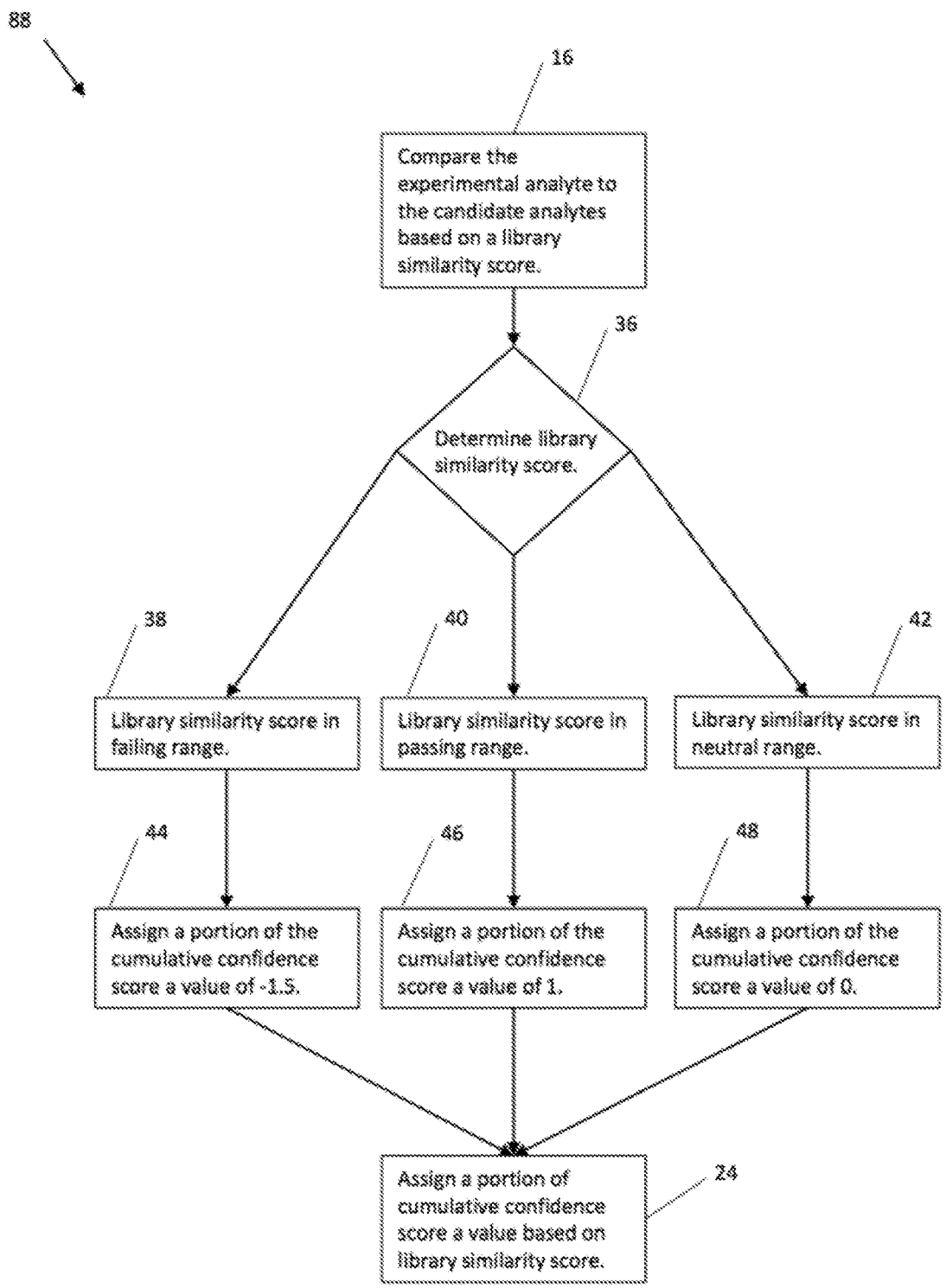
FIG. 2 is a flowchart of a portion of the method for ranking analytes.

With reference to FIG. 2, a method for comparing library similarity scores 88 is generally shown. Library similarity score, and related criteria, may also be referred to as Factor 1. The method 88 may include determining the library similarity score of each candidate analyte 36. For example, the library similarity score may have a failing range of values equal to and below X, a passing range of values equal to and above Y, and a neutral range of values between X and Y. X may be, for example, 600, and Y may be, for example, 800. Alternatively, X and Y may be any suitable value. The failing range, neutral range, and passing range may be defined by a user, and may be any suitable ranges of values. If the library similarity score is within the failing range 38, e.g., equal to or below 600, then a portion of the cumulative confidence score may be assigned a value of −1.5 at step 44. If the library similarity score is within the passing range 40, e.g., equal to or above 800, then a portion of the cumulative confidence score may be assigned a value of 1 at step 46. If the library similarity score is within the neutral range 42, e.g., between 601 and 799, then a portion of the cumulative confidence score may be assigned a value of 0 at step 48.

Figure 3:
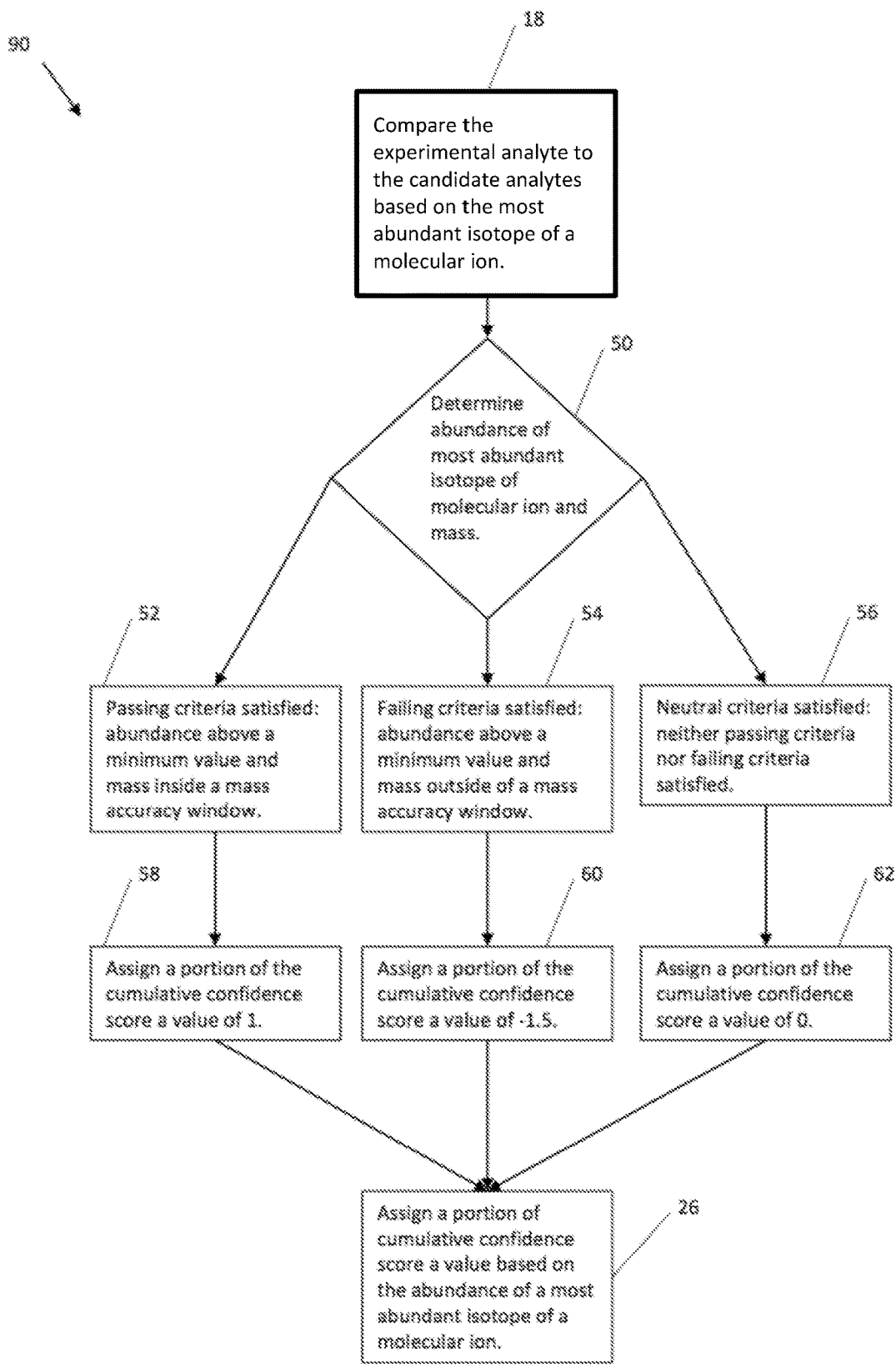
FIG. 3 is a flowchart of a portion of the method for ranking analytes.

With reference to FIG. 3, a method for comparing the most abundant isotope of a molecular ion 90 is generally shown. The most abundant isotope of a molecular ion, and related criteria, may also be referred to as Factor 2. The user may assign a mass accuracy window, for example, in ppm or mDa units, and the user may assign a minimum acceptable abundance of molecular ions most abundant isotope in a library spectrum. The method 90 may include determining the presence of a most abundant isotope of a molecular ion and its m/z. The most abundant isotope of the molecular ion may have a failing criteria, a passing criteria, and a neutral criteria based on the minimum acceptable abundance and the mass accuracy window. The failing criteria may require the abundance of the most abundant isotope of the molecular ion to exceed the minimum acceptable abundance and a mass of the most abundant isotope of the molecular ion to be outside of the mass accuracy window. The passing criteria may require the abundance of the most abundant isotope of the molecular ion to exceed the minimum acceptable abundance and the mass of the most abundant isotope of the molecular ion to be within the mass accuracy window. The neutral criteria may be satisfied if the failing criteria and the passing criteria are not satisfied. If the passing criteria is satisfied 52, e.g., the abundance of a most abundant isotope of a molecular ion is above the minimum acceptable abundance and the mass is within the mass accuracy window, a portion of the cumulative confidence score may be assigned a value of 1 in step 58. If the failing criteria is satisfied 54, e.g., the abundance of a most abundant isotope of a molecular ion is above the minimum acceptable abundance and the mass is outside of the mass accuracy window, a portion of the cumulative confidence score may be assigned a value of −1.5 in step 60. If the neutral criteria is satisfied 56, e.g., neither the passing criteria nor the failing criteria are satisfied, a portion of the cumulative confidence score may be assigned a value of 0 in step 62.

A minimum number of ions in an ion peak to be considered for mass accuracy criteria may be defined as, for example, 25 ions. If an ion peak in a mass spectrum contains less than the minimum number of ions, e.g., 25 ions, and those ions are used for defining the corresponding cumulative confidence scores, then the neutral criteria may be satisfied and a portion of the cumulative confidence score may be assigned a value of 0. As another example, a more elaborate definition for the minimum number of ions and mass accuracy window may be implemented based on, for example, resolving power of the system, m/z of the ion in consideration, spectra acquisition rate, chromatographic peak width, etc. Ion peaks which have intensity above the system capability to detect them correctly, e.g., saturated ions, may be ignored.

Figure 4:
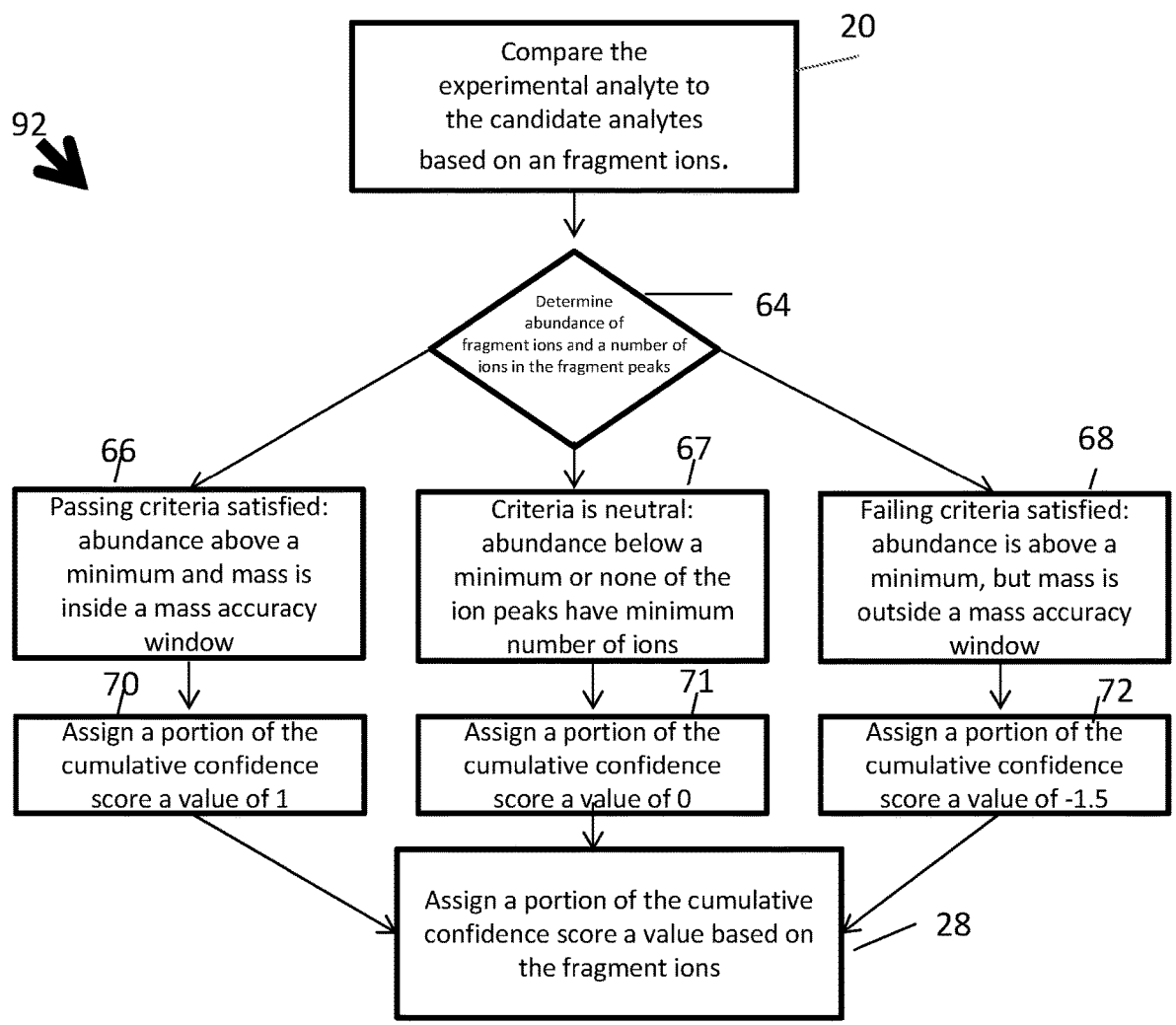
FIG. 4 is a flowchart of a portion of the method for ranking analytes.

With reference to FIG. 4, a method for comparing the fragment ions 92 is generally shown. The fragment ions, and related criteria, may also be referred to as Factor 3. The user may define a minimum acceptable abundance of the fragment ions. For example, the minimum acceptable abundance of the fragment ions may be Z %. For example, Z may be equal to 300 out of 1000, i.e., 30%, or any other suitable value. The user may define a mass accuracy window, for example, in ppm or mDa units. The fragment ions may have a passing criteria, a neutral criteria and a failing criteria based on the minimum acceptable abundance and the mass accuracy window. The passing criteria may be satisfied if the abundance of the fragment ions exceeds the minimum acceptable abundance and the mass of the fragment ions, in which chemical formulae are generated only from the subsets of the chemical elements of the molecular formula of the candidate analyte, is within the mass accuracy window, while fragment ions chemical formulae may only be a subset of the elements from the molecular formula of the candidate analyte. The failing criteria may be satisfied if the abundance of the fragment ions exceed the minimum acceptable abundance and the mass of the fragment ions, in which chemical formulae are generated only from the subsets of the chemical elements of the molecular formula of the candidate analyte, is outside of the mass accuracy window. The neutral criteria may be satisfied if there are no fragment ions to exceed the minimum acceptable abundance or the number of ions in the peaks are below the minimum criteria. If the passing criteria is satisfied 66, e.g., the abundance of the fragment ions is above the minimum acceptable abundance and the mass is within the mass accuracy window, a portion of the cumulative confidence score may be assigned a value of 1 in step 70. If the failing criteria is satisfied 68, e.g., the passing criteria is not satisfied, a portion of the cumulative confidence score may be assigned a value of −1.5 in step 72. If the neutral criteria is satisfied 67, e.g., the abundance of the fragment ions is below the minimum acceptable abundance or none of the fragment ion peaks are above the minimum criteria, a portion of the cumulative confidence score may be assigned a value of 0 in step 71.

A minimum number of ions in an ion peak to be considered for mass accuracy criteria may be defined as, for example, 25 ions. If an ion peak in a mass spectrum contains less than the minimum number of ions, e.g., 25 ions, and those ions are used for defining the corresponding cumulative confidence scores, then a neutral criteria may be satisfied and a portion of the cumulative confidence score may be assigned a value of 0. As another example, a more elaborate definition for the minimum number of ions and mass accuracy window may be implemented based on, for example, resolving power of the system, m/z of the ion in consideration, spectra acquisition rate, chromatographic peak width, etc. Ion peaks which have intensity above the system capability to detect them correctly, e.g., saturated ions, may be ignored.

Figure 5:
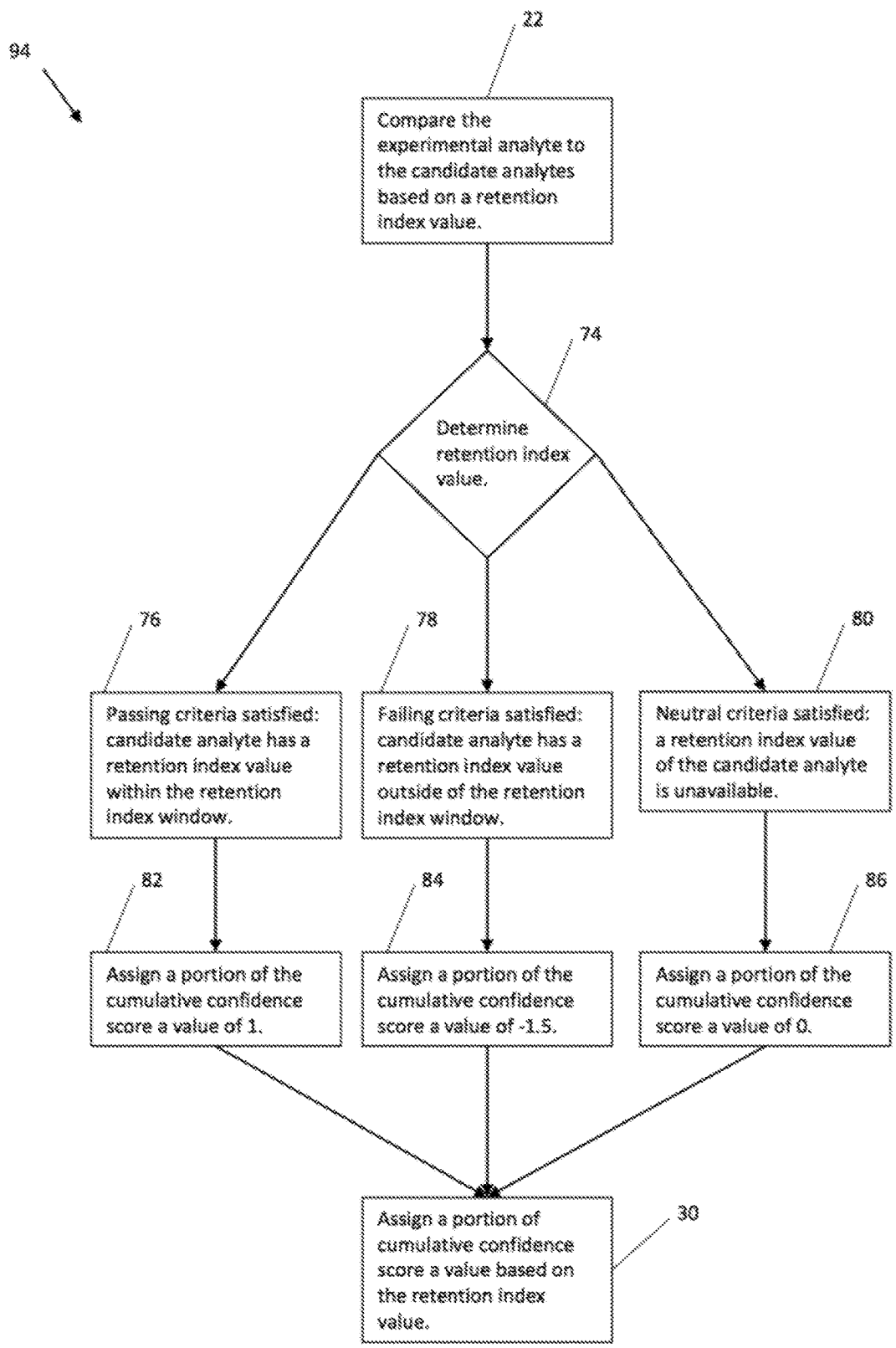
FIG. 5 is a flowchart of a portion of the method for ranking analytes.

With reference to FIG. 5, a method for comparing the retention index values 94 is generally shown. Retention index values may also be referred to as Factor 4. The user may define an acceptable retention index window. For example, the acceptable retention index window may be W units. For example, W may have a value of 50, or any other suitable value. The retention index value may have a passing range, a neutral criteria, and a failing range based on the acceptable retention index window. The passing range may be within the acceptable retention index window. The neutral criteria may require the retention index value of the candidate analyte to be unavailable. The failing range may be outside the acceptable retention index window. If the passing criteria is satisfied 76, e.g., the retention index value of the candidate analyte is within the acceptable retention index window, a portion of the cumulative confidence score may be assigned a value of 1 in step 82. If the failing criteria is satisfied 78, e.g., the retention index value of the candidate analyte is outside of the acceptable retention index window, a portion of the cumulative confidence score may be assigned a value of −1.5 in step 84. If the neutral criteria is satisfied 80, e.g., the retention index value of the candidate analyte is unavailable, a portion of the cumulative confidence score may be assigned a value of 0 in step 86.

With reference to FIG. 1, the portions of the cumulative confidence score may be summed to determine the cumulative confidence score for each candidate analyte 32. The cumulative confidence score may range from −6 to 4. The candidate analytes may be ranked in descending order of the cumulative confidence score of each candidate analyte 34. For example, the candidate analytes may be ranked in descending order of the cumulative confidence score of each candidate analyte by default, and a secondary sort may be by spectral similarity score in case of equal values of cumulative confidence scores for two or more candidate analytes. If there is still a tie, the first found candidate analyte may be ranked higher than the later found candidate analytes.

The method for ranking analytes 10 may improve reliability of the candidate analyte suggestions by excluding erroneous hits, and moving to the top of the hit list candidate analytes which are more probably from gas chromatography, e.g., Factor 4, and mass spectrometry, e.g., Factors 1-3.

To assist the user with understanding how the cumulative confidence scores were calculated, the hit table may include a concerns column with notes indicated which factors were assigned a neutral value, e.g., 0, or a failed value, e.g., −1.5.

As another example, the value assigned to a portion of the cumulative confidence scores, e.g., the passing value, failing value, and neutral value, may be modified for each factor to better reflect importance of the various factors on reliability of the assignment. For example, if Factor 1 was determined to be more important than Factor 2, the values assigned to the failing, neutral, and passing ranges in Factor 1 may be changed from −1.5, 0, and 1 to −2.5, 0, and 2, respectively. As another example, additional factors may be added based on other criteria, such as, for example, isotope abundance.

A number of implementations have been described. Nevertheless, it will be understood that various modifications may be made without departing from the spirit and scope of the disclosure. Accordingly, other implementations are within the scope of the following claims.

What is claimed is:

1. A method for analyzing an experimental analyte, the method comprising:
    analyzing the experimental analyte in a mass spectrometer;
    comparing the experimental analyte to a plurality of candidate analytes in a library hit list, and assigning a cumulative confidence score to each candidate analyte based on the steps of:
        comparing the experimental analyte to the candidate analytes based on a library similarity score;
        comparing the experimental analyte to the candidate analytes based on a presence of the most abundant isotope of a molecular ion and a mass of the most abundant isotope of the molecular ion; and
        comparing the experimental analyte to the candidate analytes based on an abundance of fragment ions, number of ions in the peaks, and a mass of the fragment ions; and
    ranking the candidate analytes based on the cumulative confidence score of each candidate analyte; and
    assigning, based on the ranked candidate analytes, a particular candidate analyte to the experimental analyte.

2. The method of claim 1, wherein the library similarity score has a failing range of values equal to or below X, a passing range of values equal to or above Y, and a neutral range of values between X and Y.

3. The method of claim 2, wherein a portion of the cumulative confidence score of a candidate analyte in the failing range is assigned a value of −1.5, a portion of the cumulative confidence score of a candidate analyte in the neutral range is assigned a value of 0, and a portion of the cumulative confidence score of a candidate in the passing range is assigned a value of 1.

4. The method of claim 1, wherein the most abundant isotope of the molecular ion has a failing criteria, a passing criteria, and a neutral criteria based on a minimum acceptable abundance and a mass accuracy window, the failing criteria requiring the abundance of the most abundant isotope of the molecular ion to exceed the minimum acceptable abundance and a mass of the most abundant isotope of the molecular ion to be outside of the mass accuracy window, the passing criteria requiring the abundance of the most abundant isotope of the molecular ion to exceed the minimum acceptable abundance and the mass of the most abundant isotope of the molecular ion to be within the mass accuracy window, and the neutral criteria being satisfied if the failing criteria and the passing criteria are not satisfied.

5. The method of claim 4, wherein a portion of the cumulative confidence score of a candidate analyte satisfying the failing criteria is assigned a value of −1.5, a portion of the cumulative confidence score of a candidate analyte satisfying the passing criteria is assigned a value of 1, and a portion of the cumulative confidence score of a candidate analyte satisfying the neutral criteria is assigned a value of 0.

6. The method of claim 1, wherein the fragment ions have a passing criteria, a neutral criteria and a failing criteria based on a minimum acceptable abundance and a mass accuracy window, the passing criteria requiring (i) the abundance of the fragment ions to exceed the minimum acceptable abundance and (ii) the mass of the fragment ions to be within the mass accuracy window, and the neutral criteria being satisfied if there are no fragment ions exceeding a minimum abundance criteria or if none of the fragment ion peaks contain at least a minimum number of ions.

7. The method of claim 6, wherein a portion of the cumulative confidence score of a candidate analyte satisfying the passing criteria is assigned a value of 1, a portion of the cumulative confidence score of a candidate analyte satisfying the failing criteria is assigned a value of −1.5, and a portion of the cumulative confidence score of a candidate analyte satisfying the neutral criteria is assigned a value of 0.

8. The method of claim 6, wherein the minimum acceptable abundance of the fragment ions is Z %.

9. The method of claim 1, wherein the steps of comparing the experimental analyte to a plurality of candidate analytes in a library hit list, and assigning a cumulative confidence score to each candidate analyte, further comprises the step of:

comparing the experimental analyte to the candidate analytes based on a retention index value.

10. The method of claim 9, wherein the retention index value is selected from retention index values from one or more dimensions.

11. The method of claim 9, wherein the retention index value has a passing range, a neutral criteria, and a failing range based on an acceptable retention index window, the passing range being within the acceptable retention index window, the neutral criteria requiring the retention index value of the candidate analyte to be unavailable, and the failing range being outside the acceptable retention index window.

12. The method of claim 11, wherein a portion of the cumulative confidence score of a candidate analyte in the passing range is assigned a value of 1, a portion of the cumulative confidence score of a candidate analyte satisfying the neutral criteria is assigned a value of 0, and a portion of the cumulative confidence score of a candidate analyte in the failing range is assigned a value of 0.

13. The method of claim 11, wherein the acceptable retention index window is W units.

14. The method of claim 1, wherein the cumulative confidence score ranges from −6 to 4.

15. The method of claim 1, wherein the candidate analytes are ranked in descending order of the cumulative confidence score of each candidate analyte.

16. The method of claim 1, wherein the step of analyzing an experimental analyte occurs using a gas chromatography—mass spectrometer.

* * * * *